United States Patent
Park

(10) Patent No.: US 9,202,115 B2
(45) Date of Patent: Dec. 1, 2015

(54) EVENT DETECTION SYSTEM AND METHOD USING IMAGE ANALYSIS

(71) Applicant: HANWHA TECHWIN CO., LTD., Changwon-Si (KR)

(72) Inventor: Ki Bum Park, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 233 days.

(21) Appl. No.: 13/795,076

(22) Filed: Mar. 12, 2013

(65) Prior Publication Data

US 2013/0236056 A1     Sep. 12, 2013

(30) Foreign Application Priority Data

Mar. 12, 2012  (KR) .......................... 10-2012-0025139
Nov. 15, 2012  (KR) .......................... 10-2012-0129606

(51) Int. Cl.
*G06K 9/00*     (2006.01)
*G08B 17/12*    (2006.01)

(52) U.S. Cl.
CPC .......... *G06K 9/00624* (2013.01); *G08B 17/125* (2013.01)

(58) Field of Classification Search
CPC ............ G06K 9/00624; G06K 9/0063; G06K 9/00637; G06K 9/4652; G06K 9/4661; G06T 7/0067; G06T 7/0069; G06T 7/0071; G06T 2207/30232; G08B 17/10; G08B 17/103; G08B 17/12; G08B 17/125; G01N 21/53; G01N 21/534
See application file for complete search history.

(56) References Cited

U.S. PATENT DOCUMENTS

| 5,289,275     | A   | *  | 2/1994  | Ishii et al.       | 348/154  |
| 2008/0136934  | A1  | *  | 6/2008  | Zhao et al.        | 348/226.1 |
| 2008/0186191  | A1  | *  | 8/2008  | Shen-Kuen et al.   | 340/628  |
| 2010/0073477  | A1  | *  | 3/2010  | Finn et al.        | 348/143  |
| 2010/0098335  | A1  | *  | 4/2010  | Yamagishi et al.   | 382/168  |
| 2012/0195462  | A1  | *  | 8/2012  | Pu et al.          | 382/103  |
| 2013/0336526  | A1  | *  | 12/2013 | Cetin et al.       | 9/657    |

FOREIGN PATENT DOCUMENTS

| JP | 2001-67566 A    | 3/2001 | ............. G08B 17/12 |
| JP | 2007-272532 A   | 10/2007 | ............. G08B 17/12 |
| KR | 1999-024377 A   | 4/1999 | ............. H04N 7/18 |
| KR | 10-2011-0075798 A | 7/2011 | ............. G08B 17/00 |

OTHER PUBLICATIONS

Chen et al., "An Early Fire-Detection Method Based on Image Processing", Proc. 2004 IEEE Int'l Conf. on Image Processing, Oct. 2004, vol. 3, pp. 1707-1710.*

* cited by examiner

*Primary Examiner* — Andrew W Johns
(74) *Attorney, Agent, or Firm* — Sughrue Mion, PLLC

(57) ABSTRACT

Provided is an event detection system including an image acquisition unit that acquires an image of a predetermined region, an image analysis unit that obtains focus data including a focus distance and a focus gain of the acquired image, an event occurrence determination unit that determines based on the focus data whether an event has occurred, and an alarm generation unit that generates an alarm signal according to an event signal transmitted from the event occurrence determination unit.

8 Claims, 8 Drawing Sheets

EVENT DETECTION SYSTEM AND METHOD USING IMAGE ANALYSIS

CROSS-REFERENCE TO RELATED APPLICATIONS

This application claims priority from Korean Patent Applications No. 10-2012-0025139 filed on Mar. 12, 2012 and No. 10-2012-0129606 filed on Nov. 15, 2012 in the Korean Intellectual Property Office, the disclosures of which are incorporated herein by reference in their entirety.

BACKGROUND

1. Field

Apparatuses and methods consistent with exemplary embodiments relate to an event detection system and a method using image analysis, and more particularly, to an event detection system and method using image analysis, which can detect an event, such as smoke and/or fire, by determining edge signals, brightness of screen data and color data by analyzing a photographed image.

2. Description of the Related Art

In order to detect a fire in the related art, fire sensors, including a smoke sensor, a heat sensor or a flame sensor, are used. However, another fire detecting method, for example, a fire detecting method using an image photographed by a camera, may be used in view of the high cost incurred by installing the fire sensor.

For example, in a fire detecting method using a video camera, proposed in Korean Patent Application No. 1997-0045434, the cost required to install a fire sensor is reduced by detecting occurrence of a fire by a fire sensing camera using infrared (IR).

FIG. 1 is a block diagram of an IR camera of the related art. The IR camera includes a lens 10, an optical filter 20, a change-couple device 30, an amplifier 40, an analog/digital converter 50, a plurality of color separators 60 and 70, a microcomputer 90 and an integral detection device 80. The IR camera of the related art is driven as follows. In the IR camera, since an optical filter 20 from which an IR blocking area is removed is employed, photoelectric conversion in an IR area is enabled, and photoelectrically converted IR area signals are detected by a sensor having yellow and magenta color filters. That is, the detected IR area signals are red-series signals. If an amount of incident IR increases due to fire occurrence, an amount of red color signals also increases. Thus, if the amount of red color signals increases by greater than or equal to a predetermined level, compared to normal times, a fire detection signal is generated.

However, the fire detection camera using IR signals may pose several problems. For example, even if a fire has occurred, only heavy smoke is displayed on a detection screen during an early stage of the fire, and the fire is not detectable from the detection screen due to the heavy smoke, making it difficult to detect the fire in the early stage.

In addition, the fire detection camera using IR signals requires an IR filter, which is disadvantageous in view of color reproducibility.

SUMMARY

One or more exemplary embodiments provide an event detection system and method using image analysis, which can detect an event, such as smoke and/or fire, by comprehensively determining edge signals, brightness of screen data and color data by analyzing a photographed image.

One or more exemplary embodiments also provide an event detection system and method using image analysis, in which image analysis is adaptively employed according to fire conditions, such as an early fire condition and an aggravated fire condition, and different alarm signals are generated in the respective conditions.

One or more exemplary embodiments also provide an event detection system and method using image analysis, which can detect not only a fire condition but also occurrence of smoke cloud, such as fog, or generation of gases, using image analysis.

According to an aspect of an exemplary embodiment, there is provided an event detection system including an image acquisition unit that acquires an image of a predetermined region, an image analysis unit that obtains focus data including a focus distance and a focus gain of the acquired image, an event occurrence determination unit that determines based on the focus data whether an event has occurred, and an alarm generation unit that generates an alarm signal according to an event signal transmitted from the event occurrence determination unit.

The event occurrence determination unit may generate a first event signal to determine that there is a smoke occurrence possibility if the focus gain changes and is maintained at a value less than or equal to a predetermined critical focus gain for a second time duration.

The event occurrence determination unit may generate a second event signal to determine that smoke has occurred if the focus distance changes and is maintained at a value less than or equal to a predetermined critical distance for a third time duration.

The event occurrence determination unit may obtain focus intensity by calculating a variation in the focus gain with respect to the focus distance.

The event occurrence determination unit may generate a second event signal to determine that smoke has occurred if the focus intensity is smaller than a predetermined critical focus intensity.

The image analysis unit may further obtain at least one of brightness data, color data and motion data of the acquired image.

The event occurrence determination unit may determine that smoke or a fire has not occurred if the brightness data is varied until the brightness data exceeds a predetermined critical brightness data in less than a fourth time duration.

The event occurrence determination unit may generate a third event signal to determine that a fire has occurred if a red/yellow color data percentage is greater than a predetermined critical percentage.

The event occurrence determination unit may generate a third event signal to determine that a fire has occurred if a variation in the motion data is detected.

The event may include generation of an opaque or translucent medium.

If the focus data of the acquired image is maintained for a first time duration, the image analysis unit may set the focus distance and the focus gain of the maintained focus as a critical focus distance and a critical focus gain.

According to an aspect of another exemplary embodiment, there is provided A method of detecting an event using image analysis, the method including acquiring an image of a predetermined region, obtaining focus data including at least one of brightness data, color data and motion data of the acquired image, determining an occurrence of the event based on the at least one of brightness data, color data and motion data of the acquired image, and generating an alarm signal according to the determining of the occurrence of the event.

The method may further include extracting a focus distance and a focus gain from the focus data; and if the focus data of the acquired image is maintained for a first time duration, setting the focus distance and the focus gain of the maintained focus as a critical focus distance and a critical focus gain.

The method may further include generating a first event signal to determine that there is a smoke occurrence possibility if the focus gain changes and is maintained at a value less than or equal to a predetermined critical focus gain for a second time duration; and generating a first alarm signal according to the first event signal.

The method may further include generating a second event signal to determine that smoke has occurred if the focus distance changes and is maintained at a value less than or equal to a predetermined critical distance for a third time duration; and generating a second alarm signal according to the second event signal.

The method may further include obtaining focus intensity by calculating a variation in the focus gain with respect to the focus distance; generating a second event signal to determine that smoke has occurred if the focus intensity is smaller than a predetermined critical focus intensity; and generating a second alarm signal according to the second event signal.

The method may further include determining that smoke or a fire has not occurred if the brightness data is varied until the brightness data exceeds a predetermined critical brightness data in less than a fourth time duration.

The method may further include generating a third event signal to determine that a fire has occurred if a red/yellow color data percentage is greater than a predetermined critical percentage; and generating a third alarm signal according to the third event signal.

The method may further include generating a third event signal to determine that a fire has occurred if a variation in the motion data is greater than a predetermined critical motion data; and generating a third alarm signal according to the third event signal.

BRIEF DESCRIPTION OF THE DRAWINGS

The above and/or other features and advantages will become more apparent by describing in detail preferred embodiments thereof with reference to the attached drawings in which.

DETAILED DESCRIPTION

Apparatuses and methods consistent with exemplary embodiments will now be described more fully hereinafter with reference to the accompanying drawings. The apparatuses and methods consistent with the exemplary embodiments may, however, be embodied in different forms and should not be construed as limited to the embodiments set forth herein. Rather, these exemplary embodiments are provided so that this disclosure will be thorough and complete, and will fully convey the scope of the inventive concept to those skilled in the art. The same reference numbers indicate the same components throughout the specification. In the attached figures, the thickness of layers and regions is exaggerated for clarity.

The use of the terms "a" and "an" and "the" and similar referents in the context of describing the exemplary embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Hereinafter, an event detection system using image analysis according to an exemplary embodiment will be described with reference to FIG. 2.

Figure 1:
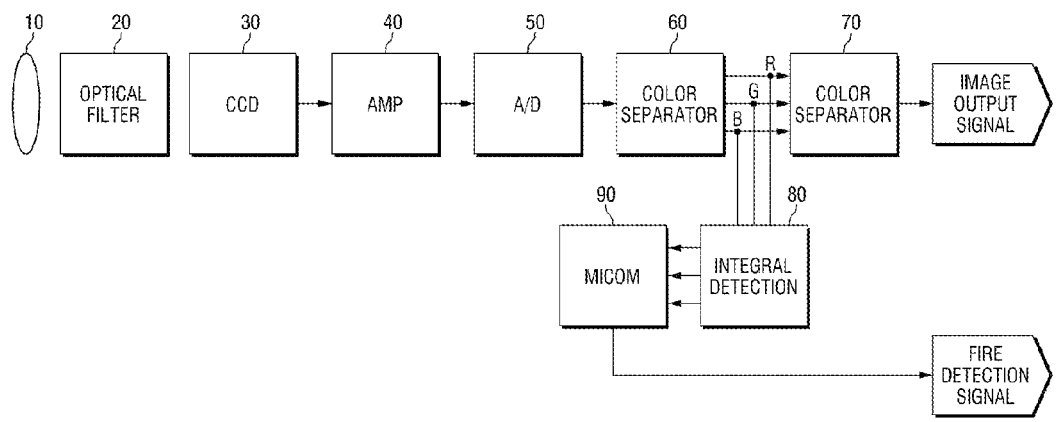
FIG. 1 is a block diagram of an infrared ray (IR) camera in the related art.
Figure 2:
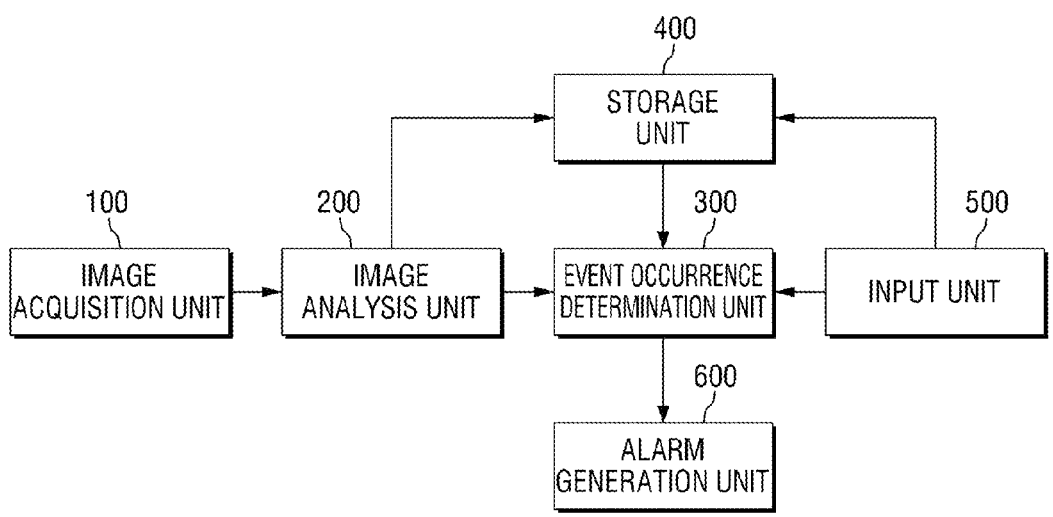
FIG. 2 is a block diagram of an event detection system using image analysis according to an exemplary embodiment.

FIG. 2 is a block diagram of an event detection system using image analysis according to an exemplary embodiment.

Referring to FIG. 2, the event detection system includes an image acquisition unit 100, an image analysis unit 200, an event occurrence determination unit 300 and an alarm generation unit 600. In addition, the event detection system may also further include a storage unit 400 and an input unit 500.

The image acquisition unit 100 photographs a predetermined region and acquires an image of the predetermined region. The image acquisition unit 100 may include, but not limited to, any type of image capture means, such as a camera, a camcorder, or the like, as long as the image capture means is capable of acquiring still images or motion images. However, in order to determine an event occurrence possibility in two stages using motion detection, motion image capturing means is preferably employed. The image acquired by the image acquisition unit 100 is transmitted to the image analysis unit 200.

The image analysis unit 200 extracts image data from the image acquired by the image acquisition unit 100. As used herein, the term "image data" include data, but are not limited to: focus data, brightness data, color data, or motion data. The focus data includes data concerning a focus gain and a focus distance. The image analysis unit 200 obtains focus data including focus distance and focus gain from the extracted image data. The image data provides determination data for separately identifying smoke or fire occurrence and smoke or fire progression by stage in the event detection system and method using image analysis according to exemplary embodiments.

Figure 3:
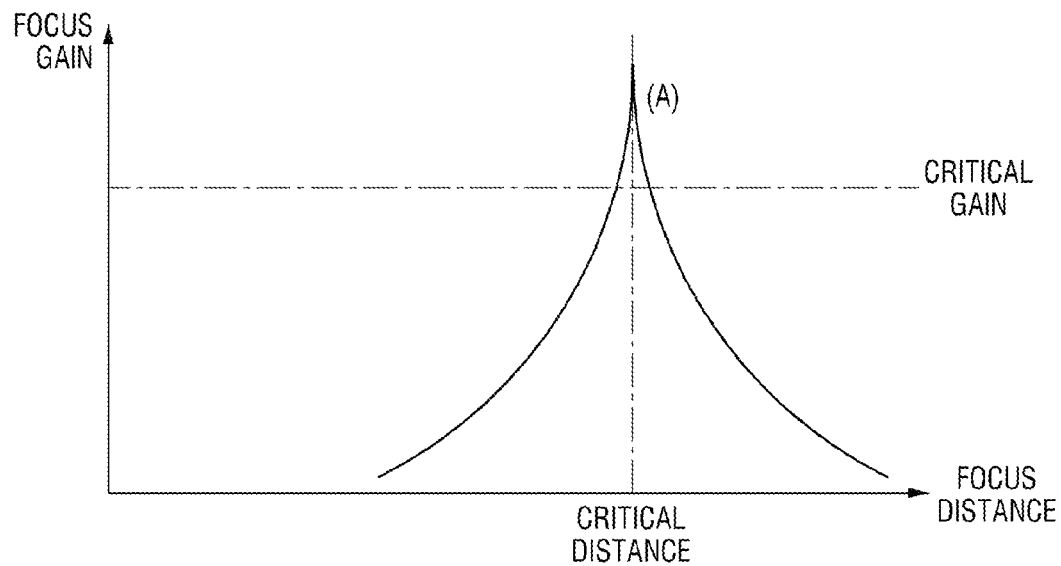
FIG. 3 is a graph illustrating changes in a focus distance and a focus gain before an event occurs according to an exemplary embodiment.
Figure 4:
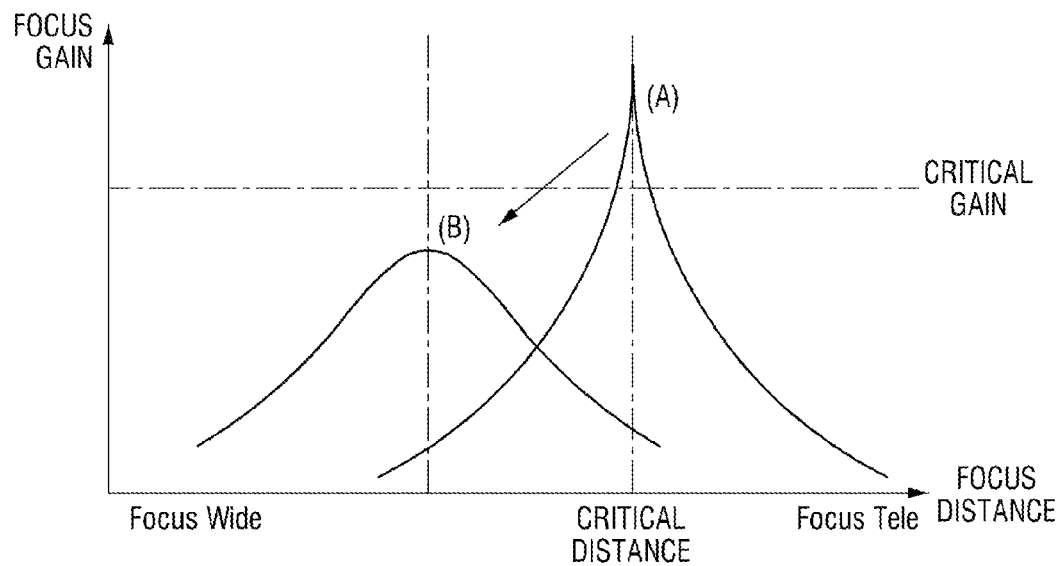
FIG. 4 is a graph illustrating changes in a focus distance and a focus gain after an event occurs according to an exemplary embodiment.

FIG. 3 is a graph illustrating aspects of a focus distance and a focus gain before an event occurs according to an exemplary embodiment, and FIG. 4 is a graph illustrating changes in a focus distance and a focus gain after an event occurs according to an exemplary embodiment.

As used herein, the term "event" is not limited to occurrence of smoke or flames due to a fire. Rather, the term "event" is used in a broad sense and may be used to describe all events which may change image data including, but not limited to: occurrence of fog or smoke cloud and gas generation. A change in the image data may be caused by an event of generation of an opaque or translucent medium.

In FIG. 3, the graph (A) illustrates a graphical representation of focus gains with respect to focus distances of an image photographed before an event occurs according to an exemplary embodiment. That is, when a subject spaced a predetermined distance apart from the image acquisition unit 100 is focused, the focus gain is relatively high at the corresponding focus distance.

In a situation in which an event of generation of an opaque or translucent medium, such as smoke or a fire has not yet occurred, subjects existing in an image may be in a stationary state. For example, if the same image is obtained for a duration of at least a predetermined time (hereinafter "a first time duration"), this situation may be determined as a normal situation in which smoke or a fire has not yet occurred.

The event occurrence determination unit 300 determines image data in a normal situation as references and allows the storage unit 400 to store the data. That is, in a case where the focus data, the brightness data, the color data and the motion data, extracted by the image analysis unit 200, are maintained without changes for the first time duration, the respective data values may be stored as reference focus data, reference brightness data, reference color data and reference motion data. Here, the first time duration can be periodically updated.

In addition, the event occurrence determination unit 300 determines whether an event has occurred or not based on the focus data, the brightness data, the color data and the motion data. For example, the event occurrence determination unit 300 determines whether an event of an opaque or translucent medium has occurred or not based on the focus data. Here, the opaque or translucent medium may include at least smoke and a fire. A process for determining event occurrence will later be described in detail.

The storage unit 400 stores information including, but not limited to: a critical focus distance and a critical focus gain of an image, set by the image analysis unit 200, critical values of brightness data input by the input unit 500, predetermined critical percentage of red/yellow color data, a first, second, third and fourth time durations and focus intensity obtained by the event occurrence determination unit 300. As used herein, the term "focus intensity" means a variation in the focus gain with respect to a variation in the focus distance. Various reference values, including the critical focus distance and the critical focus gain, the critical values of brightness data, the critical percentage, and the first, second, third and fourth time durations, can be periodically updated.

Here, the storage unit 400 is a module capable of storing information including, for example, a hard disk, a flash memory, a compact flash (CF) card, a secure digital (SD) card, a smart media (SM) card, a multimedia card (MMC), or a memory stick. The storage unit 400 may be incorporated into the event detection system or provided in a separate device.

The input unit 500 may include a button, a wheel, or a jog shuttle for setting in advance information such as critical values of brightness data, a critical percentage of red/yellow data, first, second, third and fourth time durations, to receive and relay user's command. In addition, if a display of a media player controller provides a touch screen function, the display may serve as the input unit 500. In addition, the input unit 500 may be a standalone device. For example, the input unit 500 may be a wireless remote controller. That is, the user may input information using a button or wheel provided in the wireless remote controller.

The alarm generation unit 600 generates an alarm signal according to an event signal transmitted from the event occurrence determination unit 300. The alarm signal may be any of a visual signal and an audio signal as long as the alarm signal is capable of notifying any one nearby of a possibility of event occurrence.

Hereinafter, the process for determining event occurrence using image analysis will be described in detail.

The image analysis unit 200 analyzes images photographed by the image acquisition unit 100 in a real time basis. In a case where an opaque or translucent medium, for example a fire or fog, is generated, values of image data extracted by the photographed images may change. For example, FIG. 4 is a graph illustrating changes in a focus distance and changes in a focus gain after an event of the opaque or translucent medium occurs.

In an early fire condition, for example, flames are not immediately produced, but smoke is first generated. Therefore, if only color data is used in the camera, it is not possible to recognize the early fire condition.

Accordingly, in order to detect a fire in such early stage, it is necessary to analyze changes in a focus distance and a focus gain as well as color data. As shown in FIG. 4, in an event occurrence situation, the graphical representation of an image of a focused subject is changed from the graph (A) into the graph (B). That is, in an event situation of an opaque or translucent medium, such as fog and/or a fire, the fog and/or fire is expected to occur in a nearer distance than a reference focus distance that is a distance from the image acquisition unit 100 to the focused subject. Accordingly, the focus distance will move toward a focus near side, compared to the reference focus distance.

That is, since the opaque or translucent medium, such as smoke or flames makes a focus move toward the focus near side, and an object having background edges may become blurry due to smoke or flames, a total amount of edge data is reduced, yielding the result shown in FIG. 4. If a focus gain is reduced to a focus gain value less than or equal to a critical focus gain for a predetermined time duration, there is a first possibility of event occurrence. If edge (focus) data scanned and read on a screen moves toward the focus near side and the image is recognized as roughly being in an environment in which there are indistinct edges, there is a second possibility of event occurrence.

Here, the first possibility of event occurrence means that an event occurrence possibility is preliminarily determined based on the critical focus gain, and the second possibility of event occurrence means that event occurrence is determined based on the critical focus distance or the focus intensity. For example, the first possibility indicates that there is a smoke occurrence possibility, and the second possibility indicates that smoke has occurred. Specific operations of various components of the event detection system using image analysis will now be described.

The image analysis unit 200 obtains focus data including a focus distance and a focus gain of an image acquired by the image acquisition unit 100. If the focus of the acquired image is maintained for a first time duration, the image analysis unit 200 sets the focus distance and the focus gain of the maintained focus as a critical focus distance and a critical focus gain. Here, the first time duration may be set in advance to be input through the input unit 500.

Thereafter, if the focus gain is changed and maintained to be less than or equal to the critical focus gain for a second time duration, the event occurrence determination unit 300 generates a first event signal of determining that there is a smoke occurrence possibility and then transmits the first event signal to the alarm generation unit 600. Then, the alarm generation unit 600 generates a first alarm signal according to the first event signal. That is, the first event signal is a preliminary signal indicating of a possibility that smoke may be present. Here, the second time duration may be set in advance to be input through the input unit 500. Meanwhile, the second time duration may be the same as or different from the first time duration.

Next, in order to detect a second event possibility providing a strong indication that smoke has occurred after an early fire condition, focus distance and focus intensity are used. Here, the focus intensity means a variation in the focus gain depending on a variation in the focus distance.

As described above, the image analysis unit 200 obtains focus data including the focus distance and the focus gain of the image acquired by the image acquisition unit 100. If the focus of the acquired image is maintained for a first time duration, the image analysis unit 200 sets the focus distance and the focus gain of the maintained focus of the acquired image as a critical focus distance and a critical focus gain, respectively.

Thereafter, if the focus distance is changed and maintained to be less than or equal to the critical focus distance for a third time duration, the event occurrence determination unit 300 generates a second event signal to determine whether smoke has occurred. That is, the second event signal is a principal signal indicating that smoke has occurred. As used herein, the term "smoke" may encompass gases, such as fog or smoke cloud. Occurrence of a fire can be identified by occurrence of smoke. Here, the third time duration may be set in advance to be input through the input unit 500.

In addition, the event occurrence determination unit 300 calculates the variation in the focus gain based on the focus distance to obtain the focus intensity, and may generate a second event signal to determine that smoke has occurred if the focus intensity is smaller than the predetermined critical focus intensity.

The second event signal may be generated according to each of the focus distance and the focus intensity. However, in order to secure accuracy, the second event signal to determine that smoke has occurred may be generated using both of the focus distance and the focus intensity only when the focus distance is maintained at the critical focus distance or less for the third time duration and the focus intensity is smaller than the predetermined critical focus intensity.

Figure 5:
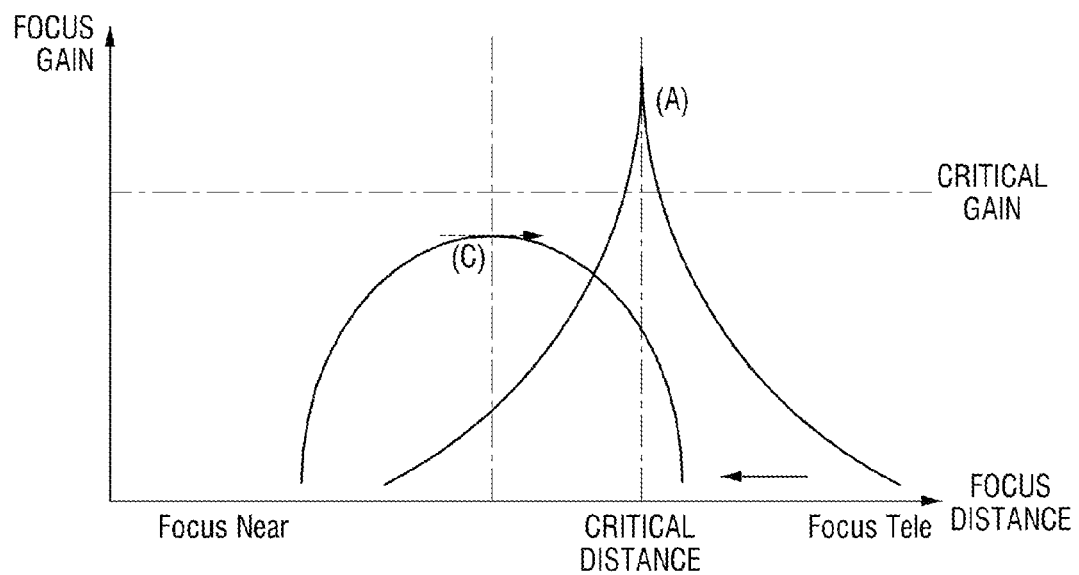
FIG. 5 is a graph illustrating ideal changes in a focus distance and a focus gain after an event occurs according to an exemplary embodiment.

FIG. 5 is a graph illustrating ideal changes in a focus distance and a focus gain after an event occurs according to an exemplary embodiment.

Referring to FIG. 5, in graph (A) representing focus gains with respect to focus distances of an image photographed before an event occurs, the focus gain corresponding to a critical focus distance is very high. In a case where an event has not yet occurred, edge data is obtained at a coincident point of image focus, and a very high level of focus intensity is obtained. That is, a variation in the focus gain depending on the focus distance is considerably large.

However, in a case where an event has occurred, the image may be out of focus due to presence of smoke. That is, the focus of the image may move toward a focus near side, and the focus gain is reduced. In addition, since edges of an object become indistinct due to the smoke, the focus gain with respect to the focus distance is reduced, so that the focus intensity becomes weak. As such, the focus intensity becomes weak in the focus of the image after event occurrence, yielding the result shown in the graph (C) of FIG. 5.

In such a manner, an event occurrence of smoke or flames can be identified by a change in the focus distance and a change in the focus intensity. Accordingly, the event occurrence determination unit 300 may generate a second event signal indicating that smoke has occurred and may transmit the second event signal to the alarm generation unit 600.

In addition, the alarm generation unit 600 generates a second alarm signal according to the second event signal. The second alarm signal may be either a visual signal or an audio signal as long as the second alarm signal can inform people nearby of a prediction that there is an event occurrence possibility or of event occurrence. Specifically, the second alarm signal may be a stronger visual/audio alarm signal than the first alarm signal.

In an event of a fire, not only smoke is generated but flames may increase with the passage of time. Thus, if a fire occurs, effects of the flames should be taken into consideration.

As described above, the image analysis unit 200 may obtain brightness data, color data and motion data of the image in addition to focus data of the image.

Based on the brightness data, color data and motion data of the image, the event occurrence determination unit 300 may generate a third event signal indicating that a fire has not yet occurred. Here, the third event signal means an event signal distinguished from the first and second event signal meaning a preliminary smoke occurrence possibility, or the second event signal meaning principal generation of smoke.

First, the event occurrence determination unit 300 may generate a third event signal using brightness data of an image, which will now be described.

The focus distance or the focus gain may be reduced due to smoke occurring in an early fire stage. However, the brightness of the image acquired due to the smoke is reduced. In such a case where the background gets dark, the focus gain is reduced. However, the background may also get dark due to various circumstances other than fire occurrence. For example, the focus gain may also be reduced in a case where an electric lamp of a region to be photographed is turned off, or in a case where a person or an object passes by directly in front of a camera, e.g., an image acquisition unit 100.

In order to distinguish a fire occurrence situation from a situation where a change in the focus gain is generated even without fire occurrence, brightness data may be used. In more detail, at an early fire stage, a reduction in the speed of decreasing brightness of a background due to smoke occurrence is low, while the speed of decreasing brightness of a background due to turning off of the electric lamp is very rapidly reduced.

If the brightness data of an image obtained by the image analysis unit 200 is varied until brightness level exceeds a predetermined critical brightness level value in less than a fourth time duration, the event occurrence determination unit 300 determines that smoke or a fire has not occurred. That is, in a case where an electric lamp is unexpectedly turned off or where brightness of a screen is rapidly changed as a whole, that is, in such an exceptional case, a fire occurrence alarm signal is not generated. Here, the critical brightness level value of the brightness data and the fourth time duration may be input through the input unit 500 to be stored in the storage unit 400.

Next, the event occurrence determination unit 300 may also generate a third event signal using color data of an image, which will now be described.

The color data is applied by analyzing how many red/yellow pixels are distributed in a photographed image. That is, in a situation where smoke occurrence is determined, if more than a predetermined level of red/yellow series color data exist in the image captured on a real time basis, it may be determined that flames increase.

In detail, if a red/yellow color data percentage is greater than a predetermined critical percentage, the event occurrence determination unit 300 generates a third event signal to determine that a fire has occurred, and transmits the third event signal to the alarm generation unit 600. The alarm generation unit 600 informs the outside of the third alarm signal based on the third event signal. Here, the critical percentage may be input through the input unit 500 to be stored in the storage unit 400. In addition, the third alarm signal may be a stronger visual/audio alarm signal than the first or second alarm signal.

Next, the event occurrence determination unit 300 may also generate a third event signal using motion data of an image, which will now be described.

Motion data is used to detect a possibility of occurrence of a smoldering fire through movement of flames in the real time captured image. That is, in a situation where it was already determined that occurrence of smoke is very highly probable, if a motion is detected from the real time captured image, or if a motion extent is greater than a movement extent of pre-stored reference motion data, it may be determined that a fire with flames increasing has occurred.

In detail, if a variation in motion data is greater than a predetermined critical motion data or if a variation in motion data is detected, the event occurrence determination unit 300 generates a third event signal to determine that a fire has occurred, and transmits the third event signal to the alarm generation unit 600. The alarm generation unit 600 informs the outside of the third alarm signal based on the third event signal. Here, the critical motion data may be input through the input unit 500 to be stored in the storage unit 400. In addition, the third alarm signal may be a stronger visual/audio alarm signal than the first or second alarm signal.

Each of the respective modules shown in FIG. 2 refers to, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. The functionality provided for in the components and modules may be combined into fewer components and modules or further separated into additional components and modules.

Figure 6:
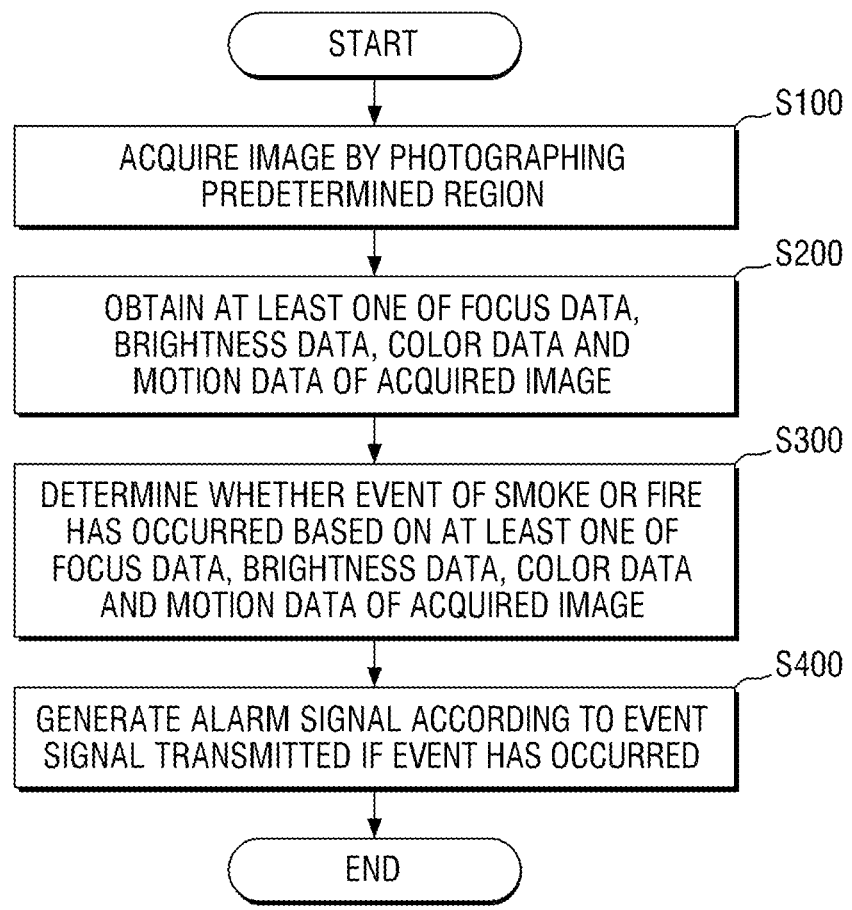
FIG. 6 is a flowchart of an event detection method using image analysis according to an exemplary embodiment.

FIG. 6 is a flowchart of an event detection method using image analysis according to an exemplary embodiment, and FIGS. 7, 8, 9 and 10 are detailed flowcharts illustrating process steps in the event detection method using image analysis according to exemplary embodiments.

Referring to FIG. 6, the event detection method using image analysis according to an exemplary embodiment includes acquiring an image by photographing a predetermined region (S100). Next, at least one of focus data, brightness data, color data and motion data of the acquired image is obtained (S200). Based on the at least one of the focus data, the brightness data, the color data and the motion data, it is determined whether an event of smoke or a fire has occurred (S300). An alarm signal is generated according to the event signal transmitted if the event has occurred (S400).

Figure 7:
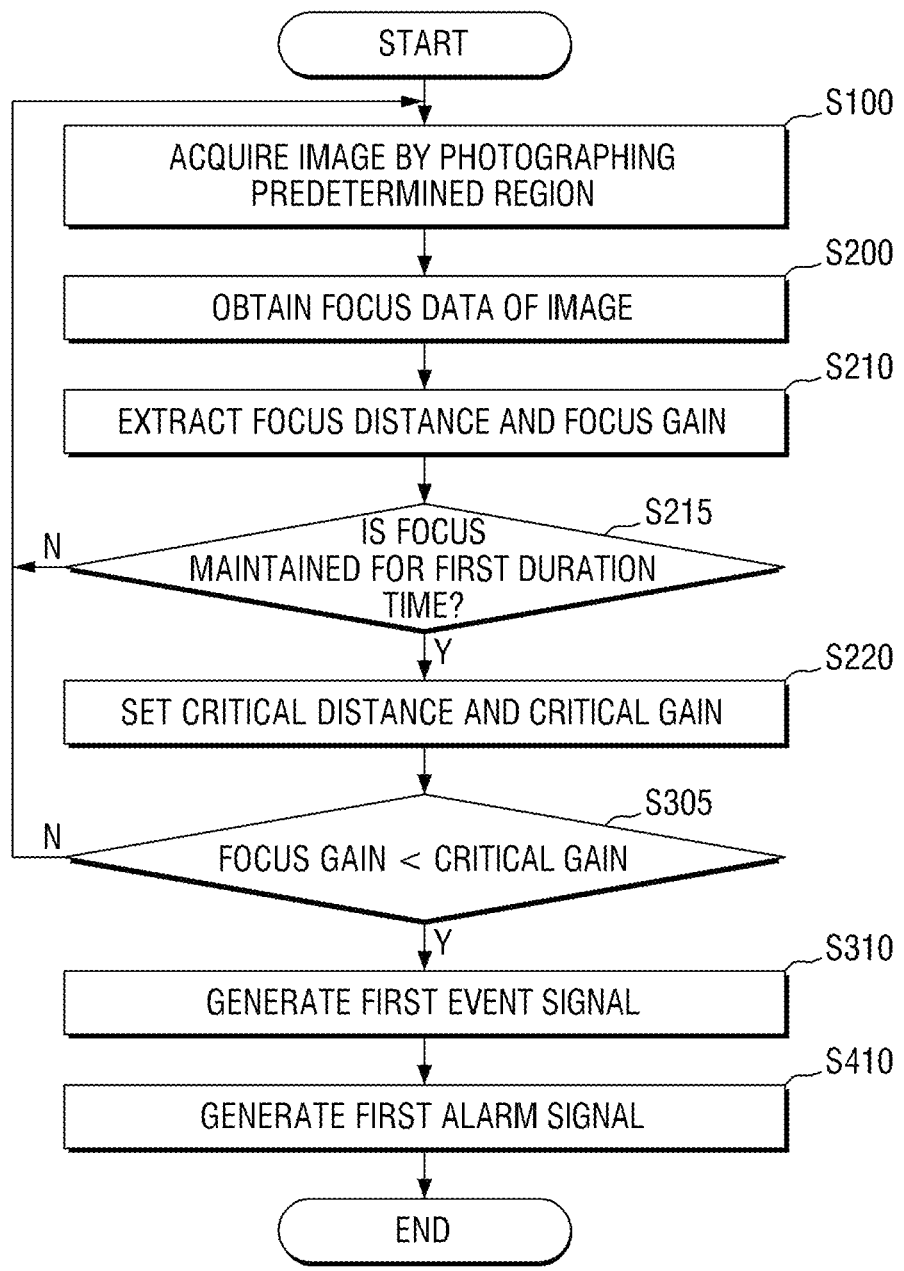
FIGS. 7 to 10 are detailed flowchart illustrating process steps in the event detection method using image analysis according to exemplary embodiments.

FIG. 7 illustrates conditions for generating a first event signal to determine whether there is a possibility of smoke (or gases such as fog or smoke cloud) occurring according to an exemplary embodiment. In detail, an image is acquired by photographing a predetermined region (S100). Focus data of the acquired image is obtained (S200), and a focus distance and a focus gain are extracted from the focus data (S210). If the focus of the acquired image is maintained during a first time duration (S215), the focus distance and the focus gain of the maintained focus are set as a critical focus distance and a critical focus gain, respectively (S220). If the focus gain is maintained at the critical focus gain or less for a second time duration (S305), a first event signal is generated to determine that there is a possibility of smoke occurring (S310), and a first alarm signal is generated according to the first event signal (S410).

Figure 8:
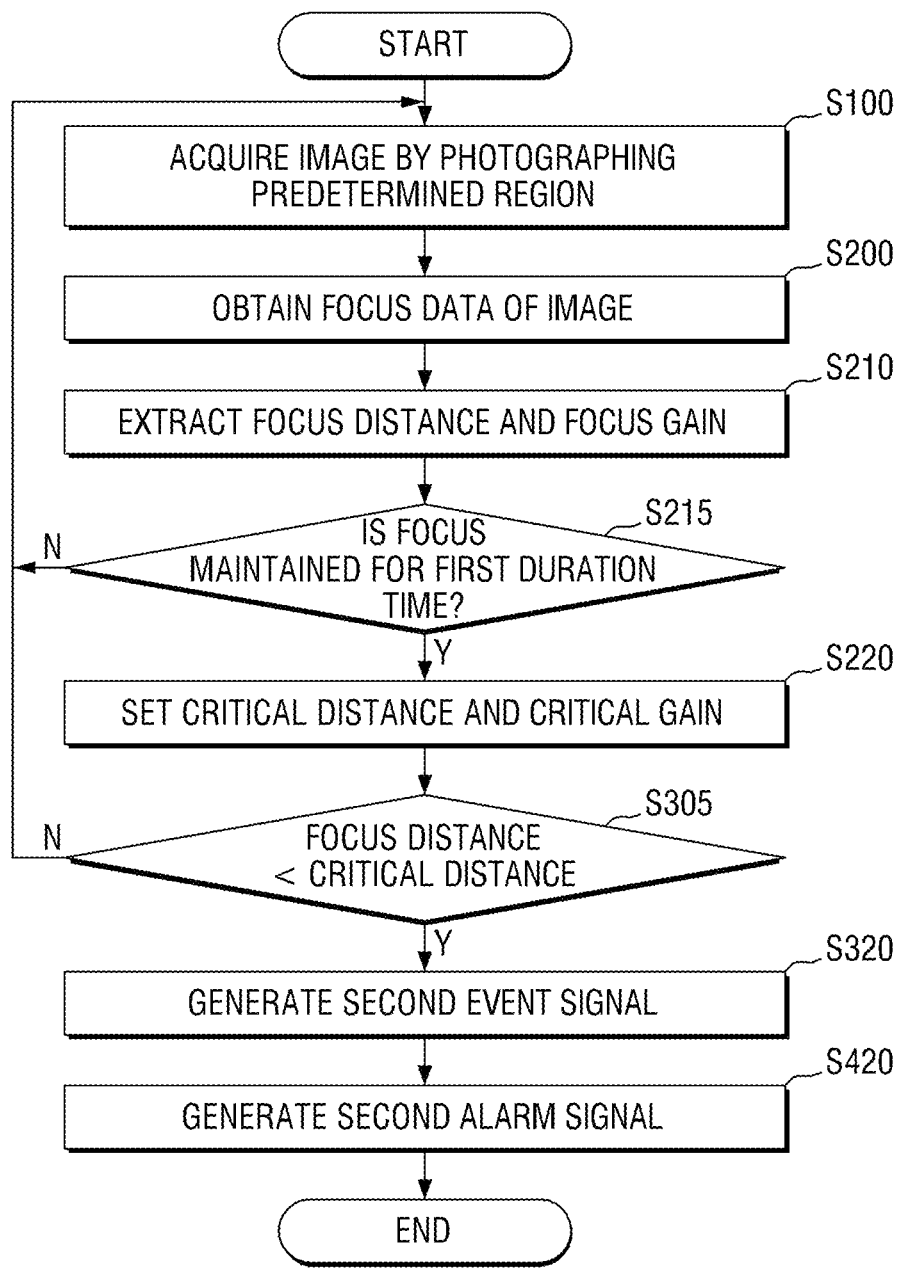

FIG. 8 illustrates conditions for generating a second event signal to determine whether smoke (or gases such as fog or smoke cloud) has occurred according to an exemplary embodiment. In detail, an image is acquired by photographing a predetermined region (S100). Focus data of the acquired image is obtained (S200), and a focus distance and a focus gain are extracted from the focus data (S210). If the focus of the acquired image is maintained during a first time duration (S215), the focus distance and the focus gain of the maintained focus are set as a critical focus distance and a critical focus gain, respectively (S220). If the focus distance is maintained at a predetermined critical focus distance during a third time duration (S315), a second event signal is generated to determine smoke has occurred (S320), and a second alarm signal is generated according to the second event signal (S420).

Figure 9:
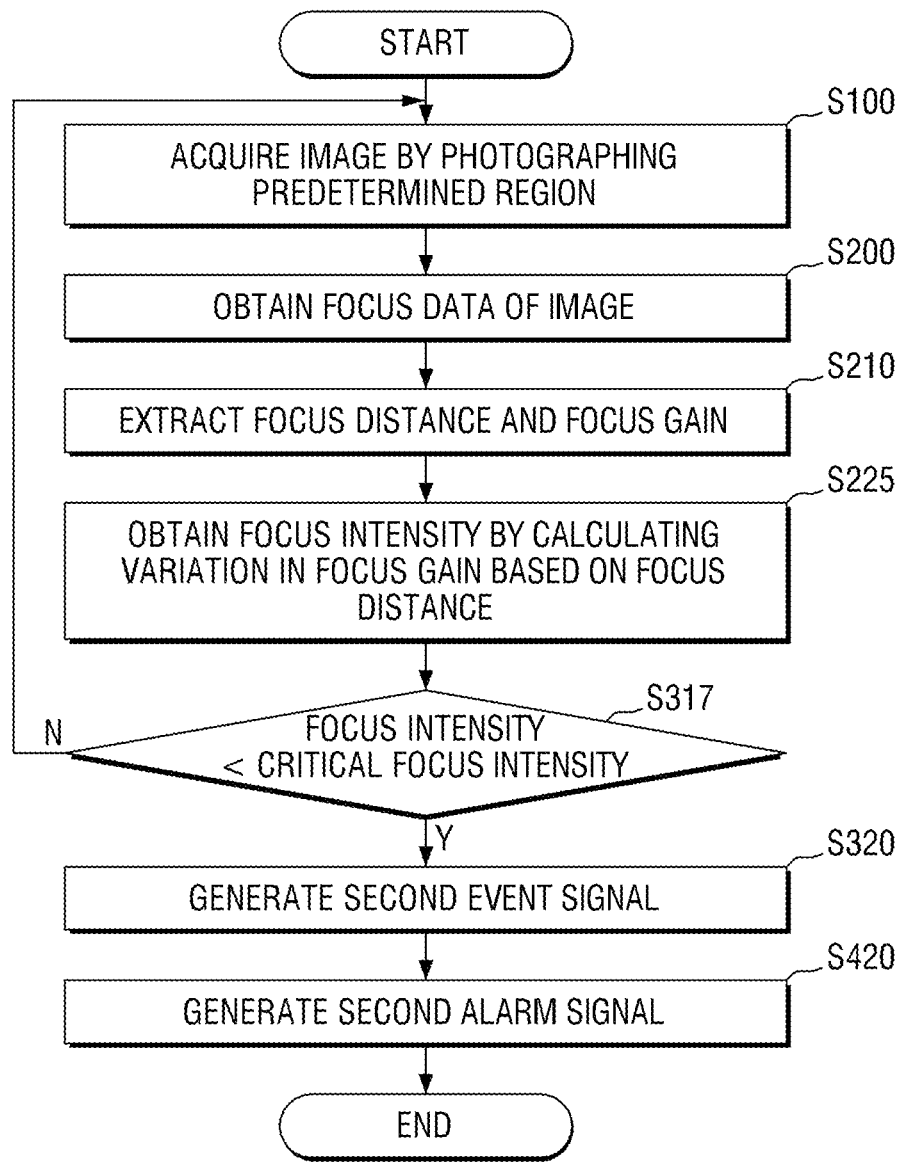

FIG. 9 illustrates other conditions for generating a second event signal to determine whether smoke (or gases such as fog or smoke cloud) has occurred according to an exemplary embodiment. In detail, an image is acquired by photographing a predetermined region (S100). Focus data of the acquired image is obtained (S200), and a focus distance and a focus gain are extracted from the focus data (S210). A variation in the focus gain based on the focus distance is calculated to obtain focus intensity (S225). It is determined whether the focus intensity smaller than a predetermined critical focus intensity (S317), and if yes, a second event signal is generated to determine that smoke has occurred (S320), and a second alarm signal is generated according to the second event signal (S420).

Figure 10:
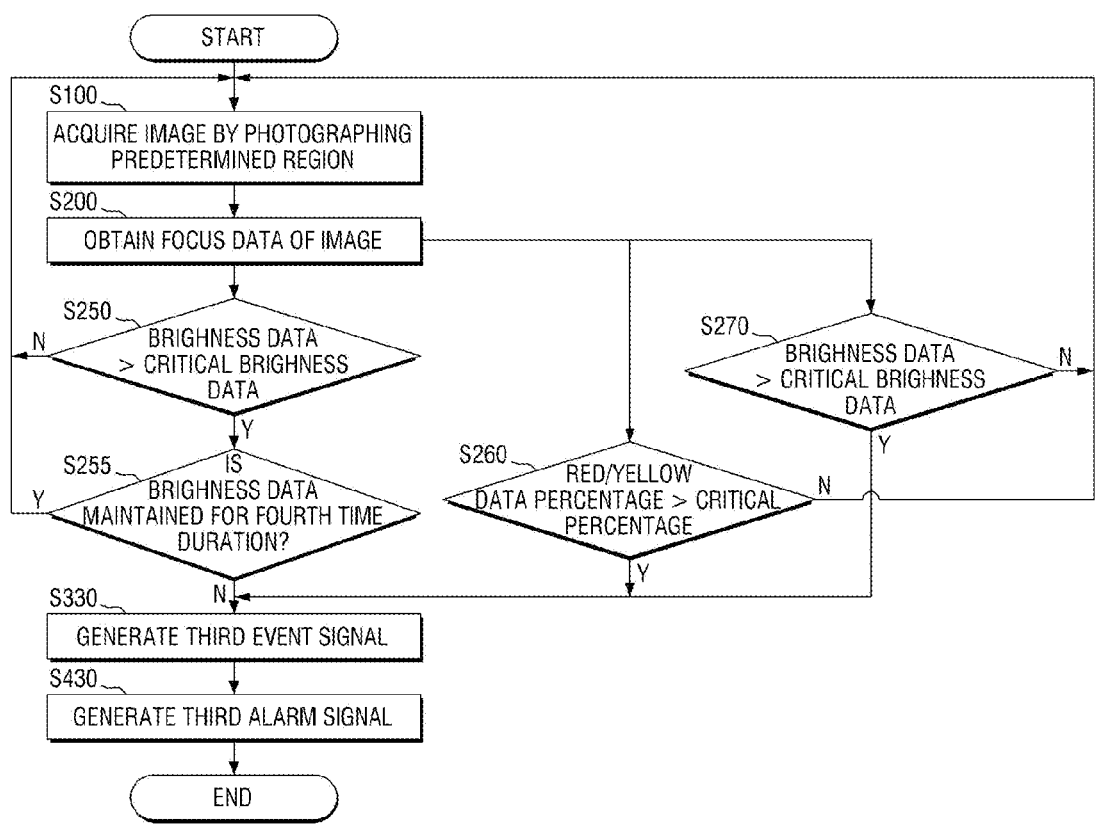

FIG. 10 illustrates conditions for generating a third event signal to determine based on flames whether a fire has occurred according to an exemplary embodiment. In detail, an image is acquired by photographing a predetermined region (S100). Brightness data, color data and motion data of the acquired image are obtained (S200). Thereafter, it is determined whether the brightness data is varied until the brightness data exceeds a predetermined critical brightness data (S250). If yes, that is, if it is determined that the brightness data is greater than the predetermined critical brightness data, it is determined whether the brightness data is maintained for a fourth time duration (S255). If no, that is, if the brightness data is not greater than the predetermined critical brightness data, a third event signal is generated to determine that a fire has occurred (S330), and a third alarm signal is generated according to the third event signal (S430).

In addition, if a red/yellow color data percentage is greater than a predetermined critical percentage (S260), a third event signal is generated to determine that a fire has occurred (S330), and a third alarm signal is generated according to the third event signal (S430).

Alternatively, if a variation in the motion data is greater than a predetermined critical motion data (S270), a third event signal is generated to determine that a fire has occurred (S330), and a third alarm signal is generated according to the third event signal (S430).

While exemplary embodiments have been particularly shown and described above, it will be understood by those of ordinary skill in the art that various changes in form and details may be made therein without departing from the spirit and scope of the present inventive concept, as defined by the following claims.

What is claimed is:

1. A method of detecting an event using image analysis, the method comprising:
    acquiring an image of a predetermined region;
    obtaining focus data including at least one of brightness data color data and motion data of the acquired image;
    extracting a focus distance and a focus gain from the focus data;
    if the focus data of the acquired age is maintained for a first time duration, setting the focus distance and the focus gain of the maintained focus as a critical focus distance and a critical focus gain;
    determining an occurrence of the event based on the at least one of brightness data, color data and motion data of the acquired image; and
    generating an alarm signal according to the determining of the occurrence of the event.

2. The event detection method of claim 1, further comprising:
    generating a first event signal to determine that there is a smoke occurrence possibility if the focus gain changes and is maintained at a value less than or equal to a predetermined critical focus gain for a second time duration; and
    generating a first alarm signal according to the first event signal.

3. The event detection method of claim 1, further comprising:
    generating a second event signal to determine that smoke has occurred if the focus distance changes and is maintained at a value less than or equal to a predetermined critical distance for a third time duration; and
    generating a second alarm signal according to the second event signal.

4. The event detection method of claim 1, further comprising:
    obtaining focus intensity by calculating a variation in the focus gain with respect to the focus distance;
    generating a second event signal to determine that smoke has occurred if the focus intensity is smaller than a predetermined critical focus intensity; and
    generating a second alarm signal according to the second event signal.

5. The event detection method of claim 1, further comprising determining that smoke or a fire has not occurred if the brightness data is varied until the brightness data exceeds a predetermined critical brightness data in less than a fourth time duration.

6. The event detection method of claim 1, further comprising:
    generating a third event signal to determine that a fire has occurred if a red/yellow color data percentage is greater than a predetermined critical percentage; and
    generating a third alarm signal according to the third event signal.

7. The event detection method of claim 1, further comprising:
    generating a third event signal to determine that a fire has occurred if a variation in the motion data is greater than a predetermined critical motion data; and
    generating a third alarm signal according to the third event signal.

8. The event detection method of claim 1, wherein the event comprises generation of an opaque or translucent medium.

* * * * *